US008497316B2

(12) United States Patent
Darby et al.

(10) Patent No.: US 8,497,316 B2
(45) Date of Patent: Jul. 30, 2013

(54) CROSSLINKABLE AND FOAMING POLYESTER-POLYURETHANE (HYBRID) RESIN MOULDING COMPOSITIONS, WITH FOAMING CHARACTERISTICS FOR CLOSED MOULD APPLICATIONS

(75) Inventors: Paul Darby, Grimsby (GB); Phil Dean, Barron on Humber (GB)

(73) Assignee: CCP Composites UK Ltd, North East Lincolnshire (GB)

( * ) Notice: Subject to any disclaimer, the term of this patent is extended or adjusted under 35 U.S.C. 154(b) by 267 days.

(21) Appl. No.: 12/682,499

(22) PCT Filed: Sep. 29, 2008

(86) PCT No.: PCT/EP2008/008281
§ 371 (c)(1),
(2), (4) Date: Apr. 9, 2010

(87) PCT Pub. No.: WO2009/046902
PCT Pub. Date: Apr. 16, 2009

(65) Prior Publication Data
US 2010/0239847 A1    Sep. 23, 2010

(30) Foreign Application Priority Data
Oct. 9, 2007 (EP) ..................... 07254003

(51) Int. Cl.
| | | |
|---|---|---|
| A63B 37/02 | (2006.01) | |
| B22C 1/22 | (2006.01) | |
| B29C 44/12 | (2006.01) | |
| B29C 65/00 | (2006.01) | |
| B32B 27/00 | (2006.01) | |
| B32B 27/40 | (2006.01) | |
| B60J 9/00 | (2006.01) | |
| B62C 1/00 | (2006.01) | |
| B62D 23/00 | (2006.01) | |
| B23D 39/00 | (2006.01) | |
| C04B 26/06 | (2006.01) | |
| C08F 8/30 | (2006.01) | |
| C08F 20/00 | (2006.01) | |
| C08F 283/04 | (2006.01) | |
| C08G 18/00 | (2006.01) | |
| C08G 18/08 | (2006.01) | |
| C08G 18/28 | (2006.01) | |
| C08G 18/42 | (2006.01) | |
| C08G 63/00 | (2006.01) | |
| C08G 73/00 | (2006.01) | |
| C08J 9/00 | (2006.01) | |
| C08J 9/12 | (2006.01) | |
| C08J 9/30 | (2006.01) | |
| C08K 3/10 | (2006.01) | |
| C08K 3/26 | (2006.01) | |
| C08L 47/00 | (2006.01) | |
| C08L 51/00 | (2006.01) | |
| C08L 67/00 | (2006.01) | |
| C08L 75/00 | (2006.01) | |
| C08L 77/00 | (2006.01) | |
| C09D 17/00 | (2006.01) | |
| E04C 1/00 | (2006.01) | |

(52) U.S. Cl.
USPC ........... 524/507; 52/309.1; 264/41; 264/45.3; 296/1.01; 296/901.01; 428/423.1; 428/424.2; 428/424.7; 521/75; 521/96; 521/97; 521/137; 521/138; 521/139; 521/140; 521/155; 521/157; 521/159; 521/170; 521/172; 524/425; 524/437; 524/539; 524/589; 524/290; 525/123; 525/440.01; 525/440.072; 525/455

(58) Field of Classification Search
USPC ............. 521/96, 97, 137, 138, 139, 155, 159, 521/170, 172, 75, 140, 157; 524/507, 589, 524/590, 425, 437, 539; 525/123, 455, 440.01, 525/440.072; 52/309.1; 264/41, 45.3; 296/1.01, 296/901.01; 428/423.1, 424.2, 424.7
See application file for complete search history.

(56) References Cited

U.S. PATENT DOCUMENTS

| | | | | |
|---|---|---|---|---|
| 3,348,251 A | * | 10/1967 | Appleton et al. | ........... 12/147 R |
| 3,860,537 A | | 1/1975 | Graham et al. | |
| 4,460,714 A | * | 7/1984 | Kamens | ........................ 521/122 |
| 5,344,852 A | | 9/1994 | Brooks et al. | |
| 2007/0049686 A1 | * | 3/2007 | Bauchet et al. | ............... 524/590 |

FOREIGN PATENT DOCUMENTS
JP           2003002947 A      1/2003

* cited by examiner

Primary Examiner — Patrick Niland
(74) Attorney, Agent, or Firm — Whyte Hirschboeck Dudek S.C.

(57) ABSTRACT

It concerns a crosslinkable and foaming polyester-polyurethane resin moulding composition, comprising: an A component, comprising: A1) at least one poly-functional isocyanate compound, and A2) at least one free radical polymerization initiator a B component, comprising by weight: B1) 100 parts of at least one polyol resin comprising: —B11) 50 to 80 parts of at least one ethylenically unsaturated polyester polyol—B 12) 20 to 50 parts of at least one ethylenically unsaturated monomer, with, B11), being the reaction product of: a) an acid component comprising: a1) at least one ethylenically unsaturated diacid, and a2) at least one saturated diacid with a1/a2 molar ratio so varying to have an unsaturation content in B11) from 0.25/1 to 5/1, and, b) a diol component in excess with respect to component a) B2) from 0.01 to 1.1 parts of water, B3) optionally, up to 35% of at least one hydroxy alkyl (meth)acrylate, B4) at least one catalyst of the isocyanate/hydroxyl reaction, B5) at least one accelerator for the free radical initiator decomposition, B6) at least one foam stabilizer, B7) optionally, fillers and/or other additives the said composition being free of any primary or of secondary amine and of any polyol of low Mw chain extender. The invention further relates to a process of preparation and specific uses in light weight articles in sanitary, building or automotive uses.

24 Claims, No Drawings

CROSSLINKABLE AND FOAMING POLYESTER-POLYURETHANE (HYBRID) RESIN MOULDING COMPOSITIONS, WITH FOAMING CHARACTERISTICS FOR CLOSED MOULD APPLICATIONS

Glass-fibre reinforced plastics (GRP) are well known as regards their suitability for use in a diverse range of sectors and applications. These include construction, automotive/transport, marine, chemical resistant plant and sanitary-ware. The products are valued for their versatility in formulation, processing and end-use. The resin matrix most commonly employed is unsaturated polyester resin (UPR). However, these materials are not without their drawbacks or limitations, which include the somewhat brittle nature of the resin matrix.

Polyester-polyurethane hybrid resins were developed to address this deficiency, and to also confer additional process and end-use benefits. The term hybrid describes a new type of polymer that is formed by the incorporation of the chemical groups and the properties of two different polymers, namely unsaturated polyester and polyurethane. Hybrid resins build molecular weight and toughness as they cure through the urethane chain-extension reaction, which occurs between the hydroxyl end groups on the unsaturated polyester and the isocyanate groups. Cross-linking occurs between the unsaturation in the polyester backbone and the styrene monomer, adding stiffness and thermal resistance. Thus, a unique blend of properties is obtained that cannot be achieved with either polymer alone.

Polyurethanes are well known for both their application as tough elastomers and processed foams, either flexible or rigid, the latter often for application in sandwich structures, imparting insulation characteristics. The closed-cell structure of these foams, in addition to the insulation properties, reduces density and enables rigidity to be achieved without excessive weight increase.

U.S. Pat. No. 5,344,852 discloses water blown unsaturated polyester-polyurethane hybrid foam compositions with water equivalent content representing 25 to 150% of the total OH of the polyol component and NCO to total OH ratio from 0.5 to 2, preferably 0.8 to 1.2, the presence of a chain extender such as a diamine and/or a polyol being essential. The preferred densities of the disclosed foams vary from 16 to 160 g/l and may go up to 560 g/l for a fillers content of 50% by weight.

Although the polyurethane foams based on saturated polyols, polyesters or polyethers, are extensively used commercially, this is not the case for the formulations of polyester-based foams, for reasons including poor consistency and variable cell structure. Some of the essential technical problems to be solved with respect to the polyurethane foam technology based on saturated polyols, are related with the additional crosslinking reaction by free radical route involving the ethylenic unsaturation of the said unsaturated polyester. The question is to be able to monitor the right order and rate of the competitive and successive reactions occurring in the foaming unsaturated crosslinkable system. Such a system comprises a polyisocyanate component and an isocyanate-reactive component, including the polyol and water as the blowing agent. A first reaction is the exothermic reaction of water with the polyisocyanate, generating carbon dioxide gas and a polyamine further reacting with a polyisocyanate to lead to a polyurea, reaction competing with the urethane formation reaction of the polyol with the said polyisocyanate and finally the free radical crosslinking reaction involving the ethylenic unsaturation, induced by the heat generation of the previous reactions and by the decomposition of the free radical initiator. In fact, the technical problem to solve is to have a reproducible, mechanically high performant and light-weight moulded article in a specific density range. The solution of the present invention is by monitoring specific reacting and foaming conditions for the unsaturated composition when moulding. In fact, the water content and the isocyanate to the total hydroxyls ratio, are specifically limited, with a composition free of chain extension components, like low molecular weight polyols and/or diamines.

The present invention further develops the concept of hybrid resins, without any chain extension polyol or diamine, to include an element of foaming, which reduces weight by at least 50%, with respect to the non foamed article and enhances the properties of toughness and rigidity in a density range of the final foamed article, particularly for sanitary moulded articles or for moulded building materials, varying from 0.4 to 1.2 g/ml and more particularly from 0.6 to 0.8 g/ml with a fillers content up to 50%.

The first subject of the invention relates to a specific crosslinkable foaming unsaturated polyester-polyurethane resin moulding composition.

A second and third subjects concern specific processes of preparing a moulded foamed article from at least one composition as defined according to the present invention.

An additional subject concerns various uses of the said foaming composition.

Finally, the invention does also cover as last subject, finished products such as foam materials and foamed articles resulting from the composition or from the processes as defined according to the present invention.

So, the first subject of the invention relates to a crosslinkable foaming unsaturated polyester-polyurethane resin moulding composition which is lightly foamed on cure to produce moulded articles. The said moulding composition comprises:

an A component, comprising:
  A1) at least one poly-functional isocyanate compound, and
  A2) at least one free radical polymerisation initiator
a B component, comprising by weight:
  B1) 100 parts of at least one polyol resin comprising:
    B11) 50 to 80 parts of at least one ethylenically unsaturated polyester polyol with hydroxyl value ranging from 80 to 170 mg KOH/g.
    B12) 20 to 50 parts of at least one ethylenically unsaturated monomer, copolymerisable with the unsaturation of the said unsaturated polyester polyol,
  with,
  the said polyester polyol B11), being the reaction product of:
    a) an acid component comprising:
      a1) at least one ethylenically unsaturated diacid selected from the group consisting of dicarboxylic acid, dianhydride, anhydride and derivatives thereof, and
      a2) at least one saturated diacid selected from the group consisting of dicarboxylic acid, dianhydride, anhydride and derivatives thereof,
      with a1/a2 molar ratio range varying from 0.25/1 to 5/1 preferably from 0.5/1 to 4/1,
    and,
    b) a diol component in excess with respect to component a) with the said polyester polyol B11) having Mn ranging from 700 to 1,250.
  B2) from 0.01 to 1.1 parts of water preferably from 0.05 to 1 part, acting as the foam generating (blowing) component, by reaction with the said polyfunctional polyisocyanate, B3) optionally, at least one hydroxy alkyl (meth)acrylate in an amount corresponding up to 35%, preferably up to 25% by weight with respect to the unsaturated monomers B12+B3, B4) at least one catalyst of the isocyanate/hydroxyl reaction, B5) at least one accelerator for the free radical initiator decomposition, B6) at least one foam stabiliser, B7) optionally, fillers and/or other additives with, the said composition being free of any primary or of secondary amine and of any polyol having Mw lower than 200 or of any other polyurethane chain extender.

The polyisocyanate A1 according to the invention, may have a functionality of at least 2 and more particularly from 2 to 4. It may be aliphatic, or aromatic or alicyclic. Examples of suitable polyisocyanates for the present invention include 4,4'-diphenylene methylene diisocyanate (MDI), isophorone diisocyanate, naphthalene diisocyanate, 4,4',4'' triphenylmethane triisocyanate, DESMODUR R®, DESMODUR N®, polymethylene polyphenyl isocyanate isocyanurate tri isocyanates, 4,4'-dimethyldiphenylmethane-2,2',5,5'-tetra isocyanate and/or mixtures.

In general, the molar ratio a2/a1 may vary from 0.2/1 to 4/1, preferably from 0.25/1-2/1, which corresponds to a2/a1 ranging respectively from 0.25/1 to 5/1 and preferably from 0.5/1 to 4/1.

More particularly in the said polyol resin B1, the said unsaturated polyester polyol B11 may be, either a mixture of at least two different unsaturated polyester polyols or it may be partly replaced by at least one vinyl ester oligomer (bearing residual secondary hydroxyls from the opening of an epoxy cycle during esterification). More particularly, up to 30% of the said polyester B11 (in OH equivalents) could be replaced by the said vinyl ester oligomer.

Preferably, the said mixture of at least two different unsaturated polyester polyols comprises a first polyester polyol with a corresponding a1/a2 ranging from 1.7/1 to 2.3/1 and a second one, with a corresponding a1/a2 molar ratio ranging from 0.9/1 to 1.4/1.

The said a1 component may be maleic anhydride or fumaric acid while the said a2 component may be isophthalic and/or terephthalic anhydride.

In the said polyester polyol B11, the OH groups of component b) are globally in excess with respect to the carboxy groups of component a), so that the final OH value of the said polyol B11 is in the range of 80 to 170, preferably 90 to 160 mg KOH/g. The global excess of OH in the synthesis of the said polyol B11 may be adjusted to up 30%.

The polyol component b) comprises diols such as ethylene glycol (EG), diethylene glycol (DEG), triethylene glycol (TEG), propylene glycol (PG), dipropylene glycol (DPG), hydrogenated bisphenol A (HBPA) neopentyl glycol (NPG), 2-methyl propane diol-1,3 (MPD), 2-butyl, 2-ethyl propane 1,3-diol (BEPD) and their mixtures, polyethylene glycols (or polyoxyethylene diols) and polypropylene glycols (or polyoxypropylene diols) of Mw between 200 and 400.

Preferably, the polyol component b) is a mixture of at least two diols and more preferably the said mixture comprises at least one branched diol, such as neopentyl glycol (NPG), 2-methyl propane diol-1,3 (MPD) or 2-butyl 2-ethyl propane diol-1,3 (BEPD) besides a linear diol such as ethylene glycol (EG), diethylene glycol (DEG) or triethylene glycol (TEG).

Monomers B12 may have at least one ethylenic unsaturation, more particularly from 1 to 2 per molecule. As examples of suitable monomers, we can cite: styrene and/or derivatives such as vinyl toluenes (o-, m, p-methyl styrene), divinyl benzene, diallyl phthalate, (meth)acrylic esters such as methyl (meth)acrylate, diethylene glycol di(meth)acrylate, dipropylene glycol di(meth)acrylate.

Additionally to comonomers B12, hydroxylated monomers may be added in the formulation as defined according to component B3, which are hydroxylated methacrylic esters more particularly hydroxy alkyl (meth)acrylates and they may be used for adjusting either the equivalent molecular weight per unsaturation (increase of B3 means increase of unsaturation and decrease of the equivalent molecular weight per unsaturation) or they may be used for adjusting the average OH functionality of the component b) in order to respect the Macosko-Miller relation, predicting non gelification conditions (Macromolecules, vol. 9, 1976, pp. 199-211). Suitable examples of B3 are: hydroxy ethyl (meth)acrylate (HE(M)A), hydroxy propyl (meth)acrylate (HP(M)A).

Preferably, the polyester-polyurethane composition of the present invention, has a ratio in equivalents of isocyanates of A1 component to the total of hydroxyls (including water reactive OH) of B component, ranging from 1.5/1 to 1.8/1. Preferably, at least every polyester polyol chain is attached to a polyisocyanate molecule, by at least two urethane bonds.

The ratio in equivalents of $H_2O$ (reactive OH) to the total of reactive hydroxyls is preferably lower than 0.30 (or 30%). The specific selection of this ratio enables adjusting the amount of $CO_2$ gas, generated by the reaction between water (B2 component) and the said polyisocyanate A1. This exothermal reaction generates a primary amine further reacting with the polyisocyanate to form an urea bond and $CO_2$, which act as the effective blowing agent, water being the precursor blowing agent. More preferably, this water equivalent ratio should range from 0.15 to 0.25 (or from 15 to 25%).

According to one embodiment of the present invention, the said composition comprises fillers B7) which may be selected from mineral fillers and more particularly from calcium carbonate and/or alumina trihydrate. The weight ratio of these fillers may vary according to the targeted density (lower density generally means lower content of mineral fillers) but also on the targeted mechanical performances (higher performances with higher filler content). Consequently, there exists a compromise to find between density and mechanical performances. The weight content of mineral fillers B7 may vary from 1 to 150 parts, preferably 15 to 100 parts with respect to 100 parts of B1 polyol resin.

Catalysts B4) are suitable for promoting the urethane formation reaction between the polyisocyanate component A1 and the Polyol component B1 (more particularly B11 polyester polyol). They may be amine- or organometallic compounds-based catalysts. Suitable amine-based catalysts are: pentamethyl diethylene triamine, trimethyl aminoethyl ethanol amine, N-methyl morpholine, tetramethyl 1,4-butanediamine, N-methyl piperazine, dimethyl ethanol amine, dimethylaminoethoxyethanol diethyl ethanol amine, triethyl amine. Preferred are: liquid catalysts such as dimethylaminoethoxyethanol.

Suitable organometallic compounds-based catalysts are: dibutyl tin dilaurate dibutyl tin oxide, dibutyl tin di-2-ethylhexanoate or stannous octanoate. Preferred are: the liquid catalysts such as DBTDL (dibutyl tin dilaurate).

As suitable accelerators B5) of the decomposition of the free radical initiator A2 can be cited: cobalt octanoate, divalent or trivalent acetyl acetonate, vanadium naphtenate or octanoate or acetyl acetonate, or tertiary aromatic amines like diethyl or dimethyl aniline, dimethyl-p-toluidine. Preferred are: diethyl or dimethyl aniline, dimethyl-p-toluidine. The accelerators B5) are used in the presence of peroxide or hydroperoxide initiators, which are decomposed by reduction by the accelerator acting as reducer.

As free radical initiators A2), can be used azo compounds such as AIBN and organic peroxides or hydroperoxides such as tert-butyl peroxybenzoate (TBPB), tert-butyl peroctoate (TBPO), benzoyl peroxide (BPO), methyl ethyl ketone peroxide (MEKPO), cumene hydroperoxide (CHPO), dicumyl peroxide (DCPO), aceto acetic peroxide. Preferred is BPO.

As foam stabilizers B6) can be used silicone-based surfactants (preferably) or non-ionic surfactants. Their weight content in the composition may vary from 0.05%-1% w/w with respect to resin B1.

The second object of this invention relates to a process of preparing a moulded foamed article from at least one composition of the invention, the said process being an injection reaction moulding in a closed mould.

More particularly, this injection reaction moulding process may comprise the steps of:
i) injection of the components A and B of the said composition mixed through the head of a dynamic mixer, under a pressure of 0.15 to 4 MPa, before
ii) partially filling the mould, under a moulding pressure equal to atmospheric pressure or partial vacuum, and before
iii) foaming and filling the whole mould under the foaming pressure as resulting from the reaction of the said water B2) with the said polyisocyanate A1), while curing (the said foaming mixture).

The time of dynamic mixture in the said dynamic mixer should preferably be higher than 10 s, more particularly at least 15 s and up to 25 s. Preferably, the composition A and B is feed at a temperature close to the temperature of the mould, which may range from 25 to 40° C.

Another process of preparing a moulded foamed article is also covered by the invention, wherein the said process comprises the steps of:
i) casting the combined mixture of A and B, preferably obtained through a dynamic mixer, into an open mould and, subsequently
ii) putting the lid of the said mould in place to let it foam and fill the whole mould, under the foaming pressure as resulting from the reaction of the said water B2) with the said polyisocyanate A1), while curing.

Another object of the invention concerns the use of the composition according to the present invention in the production of light weight moulded articles, more particularly with a density ranging from 0.4 to 1.2 g/ml and preferably from 0.6 to 0.8 g/ml.

Various uses of these moulded foamed articles are possible, among which, articles for sanitary-ware purpose, such as shower trays, bath tubs or washbasins.

Other possible uses of the said moulded articles, resulting from the composition according to the present invention, are moulded pieces for building and/or construction materials such as moulded pieces of artificial stone, or of artificial marble or of artificial concrete. In this context, beside their light weight, making them suitable and easier to be handled and lifted by building and construction workers (weight of pieces divided by at least two) these materials may also have an additional interest in this field (building and construction) for their thermal and/or acoustic insulation capacity.

Other applications and uses of the moulded articles include automotive panels, more particularly for commercial and agricultural vehicles or uses for thermal or acoustic insulation.

A foam material, more particularly having a density ranging from 0.4 to 1.2 g/ml, preferably from 0.6 to 0.8 g/ml and resulting from a foaming composition as defined according to the present invention is another subject covered by the present invention.

The last subject relates to foamed moulded articles resulting from the moulding of at least one moulding composition as defined according to the invention, particularly with a density ranging from 0.4 to 1.2 g/ml, preferably from 0.6 to 0.8 g/ml.

These foamed moulded articles can be sanitary-ware purpose, such as shower trays, bath tubs, washbasins or they can be moulded pieces of building or of construction materials, such as artificial stone, artificial marble or artificial concrete.

The said foamed moulded articles may also comprise a gel coated external finish (shower trays, bath tubs, washbasins etc). In this case, the gel coat which may be based on an unsaturated polyester or on an acrylic acrylated resin composition is firstly applied on the surface of the mould, (by spray or brush technique) and then, partially cured, before moulding foaming and curing the said foaming composition of the invention.

As an alternative to a gel coated surface, the said foamed moulded articles may comprise a finish surface composed of an acrylic or of an ABS polymer, with the moulded foam adhering on this polymer.

EXAMPLES

Polyester Polyol

Reactants were charged to a reaction kettle equipped with stirrer, thermocouple, packed column, condenser and receiver. The apparatus was mounted in an electric heating mantle and the reactions carried out under an inert nitrogen atmosphere. The reactants were slowly heated until the mix could be agitated, and further heated to achieve a column head temperature of 100-102° C. Water was removed from the system with a maximum reaction temperature of 215° C. until the requisite acid value was achieved. The resin was cooled to 120° C., inhibited with hydroquinone, then added to sufficient inhibited styrene (naphtoquinone) to achieve 70% solids. Three examples of unsaturated polyester polyols compositions are detailed in Table 1.

Table 2 gives examples of the derived formulated polyol components.

TABLE 1

| Polyol resin composition B1 | | | |
|---|---|---|---|
| | Polyol 1 | Polyol 2 | Polyol 3 |
| Fumaric acid (mol parts) | 0.67 | | |
| Maleic anhydride | | 0.67 | 0.55 |
| Isophthalic acid | 0.33 | 0.33 | 0.45 |
| Ethylene glycol | 0.66 | 0.66 | 0.66 |
| Neopentyl glycol | 0.66 | 0.66 | 0.66 |
| Styrene w/w % in B1 | 30 | 30 | 30 |
| Dibutyl tin oxide (ppm) | 500 | 500 | 500 |
| Hydroquinone (ppm) | 150 | 150 | 150 |
| Napthoquinone (ppm) | 75 | 75 | 75 |
| Acid value (on solids) in mg KOH/g | 3 | 5 | 5 |
| Hydroxyl value (on solids) in mg KOH/g | 110 | 130 | 115 |

TABLE 2

| Component B/: Formulated Compositions | | | | |
|---|---|---|---|---|
| | BI | BII | BIII | BIV |
| Polyol 1 (B1) | 50 | 25 | 25 | 25 |
| Polyol 2 (B1) | | | | 25 |
| Polyol 3 (B1) | | 25 | 25 | |
| Calcium carbonate (B7) | 50 | 50 | 45 | 45 |
| Diethyl aniline (B5) | 0.2 | 0.1 | 0.1 | 0.1 |
| Pentamethyl diethylene triamine (B4) | | | 0.1 | |
| Trimethylaminoethyl ethanolamine (B4) | | | | 0.1 |
| Dibutyl tin dilaurate (B4) | 0.1 | 0.1 | | |
| Dibutyl tin oxide (B4) | | | 0.2 | 0.2 |
| Water (B2) | 0.5 | 0.35 | 0.5 | 0.5 |
| % $H_2O/OH_{tot\,in\,B}$ (% ratio in equivalents) | 29% | 22% | 28.5% | 27% |

Component A

I) 5 parts benzoyl peroxide powder (A2) was stirred into 95 parts of component A1: MDI as Lupranat® M200R from BASF.

This MDI has an NCO functionality of 31% w/w (NCO molecular weight: 42), and is based on oligomers of high functionality (equivalent NCO index of 414 equivalent mg KOH/g).

II) 10 parts benzoyl peroxide (BPO) powder (A2) was stirred into 90 parts of component A1: MDI (Lupranat® M200R).
Formulations and Properties The A and B components were adjusted to 25° C. together with the tool.

The components were mixed on a Cowles disperser (tip speed=6 m/s) for 30 s, then dispensed into a closed steel test tool of one liter mould cavity. The tool was clamped and parts de-moulded after 20 minutes. Formulation and process variants are shown in Table 3.

Example 6 was prepared as follows:

Polyol 1 (250 g) and polyol 2 (250 g) both at 70% solids were blended together on a lab stirrer. To this mix was added diethyl aniline (1.0 g), dibutyl tin dilaurate (1.0 g), and water (3.5 g). After 20 min mixing, 500 g of calcium carbonate (mean particle size diameter of 5 μm) was added and mixing continued for 30 min.

This B component was combined with A1/in the ratio 80:20 (initiator system BPO: benzoyl peroxide as defined above). For the moulded plaques, the material charge was based on that which would achieve a 50% back pressure based on the free rise.

The free rise density is the foam density obtained, where the only resistance presented is atmospheric pressure. It can be measured simply with Archimedes flasks.

Other examples 7-14 were prepared in a similar basic manner as example 6, with varying parameters as indicated in Table 3, such as the inclusion of diethyl toluene diamine (DETA), an increased water content, a decreased hydroxyl value of polyol base, an increased hydroxyl value of polyol base and a decreased isocyanate to hydroxyl ratio. Examples 7-12 polyols were filled to 50% with calcium carbonate. Examples 13 and 14 are representative of the disclosure of U.S. Pat. No. 5,344,852, example 13 without diamine and example 14 with a diamine and correspond to 30% of calcium carbonate on the B component.

TABLE 3

| | | | | Formulations and Properties | | | | | |
|---|---|---|---|---|---|---|---|---|---|
| Formulation | $H_2O/$ OH tot % | NCO/ OH tot | Diamine and % | OH value Base mg KOH/g | Free Rise Density g/ml | Moulded Density g/ml | Flexural Strength ISO 178 | Flexural Modulus ISO 178 | Impact Resistance |
| Example 6 | 22% | 1.74/1 | None | 120 | 0.38 | 0.60 | 40 MPa | 2.0 GPa | 5.5 N-m |
| Example 7 (comp.) | 22% | 1.74/1 | 1% DETDA | 120 | 0.36 | 0.88 | 23 | 1.5 | 3.2 N-m |
| Example 8 (comp.) | 40% | 1.4/1 | None | 120 | 0.29 | 0.44 | 10 | 0.5 | 1.4 N-m |
| Example 9 | 26% | 2.0/1 | | 90 | 0.52 | 0.80 | 38 | 2.0 | 5.5 N-m |
| Example 10 | 16% | 1.28/1 | | 160 | 0.40 | 0.70 | 44 | 1.6 | 6.2 N-m |
| Example 12 (comp.) | 40% | 1.4/1 | 1% DETDA | 120 | 0.26 | 0.40 | 10 | 0.5 | 1.4 N-m |
| Example 13 (comp.) | 38% | 1.2/1 | | 167 | 0.18 | 0.34 | 9 | 0.8 | 2.3 N-m |
| Example 14 (comp.) | 38% | 1.2/1 | 1% DETDA | 167 | 0.22 | 0.40 | 12 | 0.8 | 2.3 N-m |

Comments

We see that increasing the ratio of water equivalents to total of hydroxyls above 30%, decreases the free rise density, but impairs mechanical properties.

The presence of diamine when the $H_2O/OH_{tot}$ ratio is below 30% seems to have a negative impact. It appears that the very fast gel time of these formulations impairs flow in the mould.

Within the hydroxyl range of 90-160 mg KOH/g of polyol base, good mechanicals are retained.

Variation in Moulding Conditions 600 g of components A1 and B11 were combined in the ratios indicated in Table 3.

The components were mixed on a Cowles disperser (tip speed=6 m/s), then dispensed into a closed composite test tool of one liter mould cavity. The tool was clamped and parts de-moulded after 20 minutes. Formulation and process variants are shown in Table 4.

TABLE 4

Variations in Moulding Conditions

|  | 1 | 2 | 3 | 4 | 5 |
|---|---|---|---|---|---|
| MDI A1/ (w. parts) | 15 | 20 | 15 | 15 | 15 |
| Polyol BII* (w. parts) | 85 | 80 | 85 | 85 | 85 |
| NCO/OH$_{tot}$(OH in B) (equivalents ratio) | 1.25 | 1.74 | 1.25 | 1.25 | 1.25 |
| Polyol temperature (° C.) | 30 | 30 | 30 | 25 | 30 |
| Mix time (s) | 20 | 20 | 20 | 30 | 10 |
| Tool temperature (° C.) | 35 | 35 | 20 | 37 | 35 |
| Part density (g/ml) | 0.7 | 0.65 | 0.7 | 0.8 | Variable |
| Part consistency | Even throughout | Even throughout | Bottom distorted | Gloss variable | Skin on base Tide marks |
| Flexural strength (MPa) | 40 | 35 | 30 | 35 | 15 |
| Flexural modulus (GPa) | 2.0 | 2.5 | 1.8 | 1.8 | 1.5 |

*BII correspond to a blend of polyols 1 and 3 as disclosed in Table 2

The results show the sensitivity of the process to mixing time and component/tool temperature.

Moulding Trials

The resin system was dispensed by a displacement pump-based injection machine with dynamic mixer with component A1/BII in the ratio 1/4 in volume corresponding to 15/85 w/w.

The mix was injected into a closed composite tool (cavity 6 liters), previously gel coated with a standard gel coat (Polycor Iso spray) and de-moulded after 20 minutes.

The invention claimed is:

1. A crosslinkable and foaming polyester-polyurethane resin moulding composition, comprising:
   an A component, comprising:
   A1) at least one aromatic poly-functional isocyanate compound, and
   A2) at least one free radical polymerisation initiator; and
   a B component, comprising by weight:
   B1) 100 parts of at least one polyol resin comprising:
      B11) 50 to 80 parts of at least one ethylenically unsaturated polyester polyol with hydroxyl value ranging from 80 to 170, and
      B12) 20 to 50 parts of at least one ethylenically unsaturated monomer, copolymerisable with the unsaturation of said unsaturated polyester polyol,
   with, said polyester polyol B11), being the reaction product of:
      a) an acid component comprising:
         a1) at least one ethylenically unsaturated diacid selected from the group consisting of dicarboxylic acid, dianhydride, anhydride and derivatives thereof, and
         a2) at least one saturated diacid selected from the group consisting of dicarboxylic acid, dianhydride, anhydride and derivatives thereof, with an a1/a2 molar ratio from 0.25/1 to 5/1, and,
      b) a diol component in excess with respect to component a) with said polyester polyol B11) having Mn ranging from 700 to 1,250;
   B2) from 0.35 to 1.1 parts of water as the foam generating component,
   B3) optionally, at least one hydroxy alkyl (meth)acrylate in an amount up to 35% by weight, with respect to the unsaturated monomers B12+B3,
   B4) at least one catalyst of an isocyanate/hydroxyl reaction,
   B5) at least one accelerator for free radical initiator decomposition,
   B6) at least one foam stabiliser,
   B7) optionally, a filler, other additive or both,
   with, said composition being free of any primary or secondary amine, any polyol having Mw lower than 200, and any other polyurethane chain extender, and with a ratio in equivalents of water to a total of reactive hydroxyls being lower than 0.30.

2. A composition according to claim 1, characterised in that in said polyol resin B1, said unsaturated polyester polyol B11 is a mixture of at least two different unsaturated polyester polyols or partly replaced by at least one vinyl ester oligomer.

3. A composition according to claim , characterised in that said polyester B11 is replaced by said vinyl ester oligomer.

4. A composition according to claim 2, characterised in that said unsaturated polyester polyol B11 is a mixture of at least two different unsaturated polyester polyols comprising a first polyester polyol with a a1/a2 ratio ranging from 1.7/1 to 2.3/1 and a second polyester polyol with a a1/a2 molar ratio ranging from 0.9/1 to 1.4/1.

5. A composition according to claim 1, characterised in that said a1 component is maleic anhydride or fumaric acid and said a2 component is selected from the group consisting of isophthalic acid, terephthalic acid, or an anhydride thereof.

6. A polyester-polyurethane composition as defined according to claim 1, characterised in that the ratio in equivalents of A1 isocyanates to B component total of hydroxyls (including water) is 1.5/1 to 1.8/1.

7. A polyester-polyurethane composition as defined according to claim 1, characterised in that said equivalent water ratio ranges from 0.15 to 0.25.

8. A polyester-polyurethane composition as defined according to claim 1, characterised in that said composition comprises fillers B7) selected from mineral fillers.

9. A polyester-polyurethane composition as defined according to claim 8, characterised in that said mineral fillers are selected from the group consisting of calcium carbonate and alumina trihydrate.

10. A process of preparing a moulded foamed article from at least one composition as defined according to claim 1, characterised in that said process is an injection reaction moulding in a closed mould.

11. A process as defined according to claim 10, characterised in that it comprises the steps of:
   i) injection of the components A and B of said composition through the head of a dynamic mixer under a pressure of 0.15 to 4 MPa, before
   ii) partially filling the mould under a moulding pressure equal to atmospheric pressure, and before
   iii) foaming and filling the whole mould under foaming pressure resulting from the reaction of said water component B2) with said polyisocyanate component A1), while curing.

12. A process of preparing a moulded foamed article from at least one composition as defined according to claim 1, characterised in that said process comprises the steps of:
  i) casting the combined mixture of A and B into an open mould and, subsequently
  ii putting a lid of said mould in place to allow the mixture to foam and fill the whole mould, under a foaming pressure resulting from the reaction of said water component B2) with said polyisocyanate A1), while curing.

13. A method of producing a light weight moulded article, characterized in that said method comprises the use of at least one moulding composition as defined according to claim 1.

14. The method according to claim 13 characterised in that said moulded article is for a sanitary-ware purpose.

15. The method according to claim 13 characterised in that said moulded article is for building or construction materials or automotive panels.

16. The method according to claim 13 characterised in that said moulded article is for thermal or acoustic insulation.

17. Foam material, characterised in that it results from a composition according to claim 1.

18. Foam material according to claim 17, characterised in that it has a density ranging from 0.4 to 1.2 g/ml.

19. A foamed moulded article characterised in that it results from moulding of at least one composition as defined according to claim 1.

20. A foamed moulded article according to claim 19, characterised in that it has a density ranging from 0.4 to 1.2 g/ml.

21. A foamed moulded article according to claim 19, characterised in that it is for a sanitary-ware purpose.

22. Foamed moulded articles according to claim 19, characterised in that they are moulded pieces of building or construction materials or automotive panels.

23. Foamed moulded articles according to claim 22, characterised in that they are moulded pieces of building or construction materials selected from artificial stone, artificial marble or artificial concrete.

24. Foamed moulded articles according to claim 23, characterised in that said foamed moulded articles comprise a finish surface composed of an acrylic or of an ABS polymer.

\* \* \* \* \*